(12) United States Patent
Markle

(10) Patent No.: US 7,257,458 B1
(45) Date of Patent: Aug. 14, 2007

(54) AUTOMATED INTEGRATED CIRCUIT DEVICE MANUFACTURING FACILITY USING CENTRAL CONTROL

(75) Inventor: Richard J. Markle, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 0 days.

(21) Appl. No.: 11/313,196

(22) Filed: Dec. 20, 2005

(51) Int. Cl.
G06F 19/00 (2006.01)
(52) U.S. Cl. .......................... 700/121; 438/5
(58) Field of Classification Search .............. 700/97, 700/99, 108, 121; 438/5, 761
See application file for complete search history.

(56) References Cited

U.S. PATENT DOCUMENTS

| | | | |
|---|---|---|---|
| 4,888,692 A * | 12/1989 | Gupta et al. | 700/96 |
| 5,344,365 A | 9/1994 | Scott et al. | 454/187 |
| 6,112,126 A * | 8/2000 | Hales et al. | 700/29 |
| 6,197,604 B1 * | 3/2001 | Miller et al. | 438/14 |
| 6,243,612 B1 * | 6/2001 | Rippenhagen et al. | 700/100 |
| 6,763,277 B1 * | 7/2004 | Allen et al. | 700/100 |
| 6,988,225 B1 * | 1/2006 | Purdy et al. | 714/49 |
| 2002/0082738 A1 * | 6/2002 | Goldman et al. | 700/109 |
| 2003/0180972 A1 * | 9/2003 | Al-Bayati et al. | 438/14 |
| 2005/0283498 A1 * | 12/2005 | Kuo et al. | 707/104.1 |
| 2006/0081973 A1 * | 4/2006 | Koo et al. | 257/692 |

OTHER PUBLICATIONS

Valckenares et al., "Towards a Novel Manufacturing Control Principle", 1999, Preceedings of te Second intrnational workshop.*
Funk et al., "Effective Implementation of APC", Jul. 1, 2002, Semiconductor International.*

* cited by examiner

Primary Examiner—Leo Picard
Assistant Examiner—Chad Rapp
(74) Attorney, Agent, or Firm—Williams, Morgan & Amerson, P.C.

(57) ABSTRACT

The present invention provides a method, an apparatus, and an automated semiconductor fabrication facility for determining control information based on global goals of a semiconductor manufacturing facility. The method includes accessing information indicative of at least one global goal of a semiconductor manufacturing facility, determining control information based on the at least one global goal, and providing a portion of the control information to each of a plurality of control units. Each of the plurality of control units is configured to control a corresponding manufacturing activity based on the provided portion of the control information.

25 Claims, 6 Drawing Sheets

AUTOMATED INTEGRATED CIRCUIT DEVICE MANUFACTURING FACILITY USING CENTRAL CONTROL

BACKGROUND OF THE INVENTION

1. Field of the Invention

This invention relates generally to manufacturing integrated circuit devices and, more particularly, to an automated integrated circuit device manufacturing facility employing a centralized control system.

2. Description of the Related Art

A semiconductor fabrication facility typically includes numerous processing tools used to fabricate semiconductor devices. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular product design and/or operating recipe so that a desired product is formed in or on the wafer. For example, a photolithography stepper may be used to form a patterned layer of photoresist above the wafer. Features in the patterned layer of photoresist correspond to a plurality of features, e.g. gate electrode structures, which will ultimately be formed above the surface of the wafer.

Operation of the processing tools in the semiconductor fabrication facility is generally controlled by a variety of control units, each of which is responsible for a different aspect of the fabrication process. For example, the semiconductor fabrication facility may include one or more materials handling controllers that may be responsible for providing necessary materials to the processing tools. The materials controlled by the material handling controllers may include wafers, test wafers, chemicals and/or gases used in the processing, and the like. The semiconductor fabrication facility may also include one or more wafer control units, such as run-to-run (RtR) controllers, Fault Detection and Control (FDC) controllers, Contamination Free Manufacture (CFM) controllers, and the like that may be used to monitor the wafers and/or modify the operating recipes, e.g., if faults or defects are detected. One or more excursion/exception controllers may be included to detect tool failures, shortages of supplied chemicals and/or gases, and the like. A data systems network is typically included to control the exchange of data between the processing tools and the various controllers and a planning system and control unit may be used to determine priorities associated with different products formed on the wafers processed in the semiconductor fabrication facility. Controllers may also be associated with particular types of processing tools, such as photolithography tools, etching tools, chemical mechanical polishing tools, and the like.

The control units in the semiconductor fabrication facility operate largely independently of one another. For example, the materials handling controllers may make decisions regarding provision of wafers, chemicals, and/or gases to one or more processing tools based on information collected from the processing tools. However, the materials handling controllers may not account for data collected by, or actions taken by, other control units such as the wafer control units, the excursion control units, the data systems network, and/or the planning systems controller. For another example, a photolithography tool controller may take actions to control operation of one or more photolithography tools independently of the state of other tools (e.g., etching tools, diffusion tools, chemical mechanical polishing tools, metrology tools, wafer electrical test tools, and the like) that may be a part of the same process flow as the controlled photolithography tools.

The independent nature of the various control units may make it difficult to coordinate operations of the control units to achieve global goals of the semiconductor fabrication facility. For example, the number of each type of product formed by the semiconductor fabrication facility, as well as the deadlines for producing these products, may be determined by forces such as current market demand for each product, shipping commitments made to clients, lot requests by research and development teams, and the like. In a conventional semiconductor fabrication facility, engineers manually configure the various control units to attempt to meet the global goals. This process is time-consuming, may reduce the efficiency of the semiconductor fabrication facility, and is not always successful. Furthermore, if any of the forces that determine the global goals should change, the various control units must be manually reconfigured to attempt to meet the changing goals.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In embodiments of the present invention, a method, an apparatus, and an automated semiconductor fabrication facility for determining control information based on global goals of a semiconductor manufacturing facility are provided. The method includes accessing information indicative of at least one global goal of a semiconductor manufacturing facility, determining control information based on the at least one global goal, and providing a portion of the control information to each of a plurality of control units. Each of the plurality of control units is configured to control a corresponding manufacturing activity based on the provided portion of the control information.

BRIEF DESCRIPTION OF THE DRAWINGS

The invention may be understood by reference to the following description taken in conjunction with the accompanying drawings, in which like reference numerals identify like elements, and in which.

Figure 1:
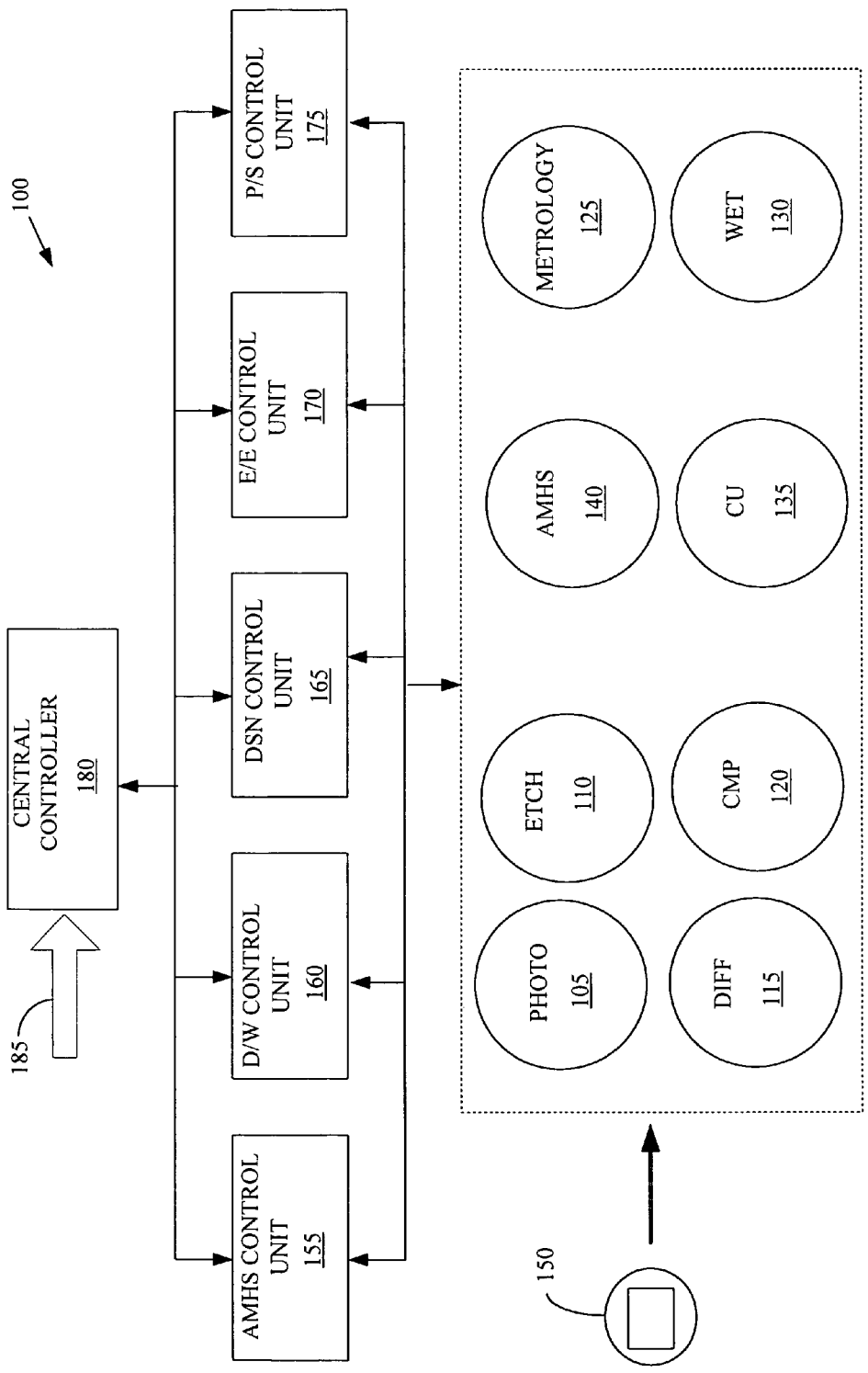
FIG. 1 conceptually illustrates one exemplary embodiment of a semiconductor manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a semiconductor manufacturing facility 100. In the interest of clarity, the various elements and/or components of a semiconductor manufacturing facility 100 will be depicted in schematic block diagrams. The physical layout of the manufacturing facility 100 will not necessarily correspond to the layout depicted in FIG. 1. The various interconnections between the elements and/or components will also be schematically depicted using arrows. The physical layout of the manufacturing facility 100, as well as the physical, communicative, and/or electrical interconnections between portions of the manufacturing facility 100, are considered matters of design choice and are not material to the present invention. Persons of ordinary skill in the art having benefit of the present disclosure should be able to implement specific layouts and the appropriate interconnections of the elements and/or components of the manufacturing facility 100 described herein.

In the illustrated embodiment, the manufacturing system 100 includes various processing tool groups such as groups of photolithography steppers 105, etch tools 110, diffusion tools 115, chemical mechanical polishing (CMP) tools 120, and the like. In the interest of clarity, only a few processing tool groups are depicted in FIG. 1. However, persons of ordinary skill in the art having benefit of the present disclosure should appreciate that the present invention is not limited to the processing tool groups 105, 110, 115, 120. In alternative embodiments, the manufacturing system 100 may include other tools or tool groups including, but not limited to, ion implantation tools, rapid thermal annealing tools, and the like. The manufacturing system 100 may also include groups of metrology tools 125 (e.g., scatterometers, ellipsometers, and the like) and/or wafer electrical testing tools 130. Each of the groups 105, 110, 115, 120, 125, 130 may include one or more individual tools (not shown), as well as one or more tool controllers (not shown) that may be used to control operation of the tools within each group 105, 110, 115, 120, 125, 130.

The illustrated manufacturing system 100 also includes a central utilities (CU) system 135, which may be used to provide materials to the tools in the processing tool groups 105, 110, 115, 120. For example, the central utilities system 135 may be used to provide consumable materials, such as process gases, process liquids, electrical power, chemical mechanical polishing pads, polishing slurry, spare parts, test or qualification wafers, process kit changes, etc. The illustrated manufacturing system 100 may also include an automated material handling system (AMHS) 140 to provide materials (such as wafers or wafer lots) to the various processing, metrology, and/or electrical testing tool groups 105, 110, 115, 120, 125, 130 or the individual tools located therein, when demanded by or scheduled for processing by one or more of the tools in one or more of the processing, metrology, and/or electrical testing tool groups 105, 110, 115, 120, 125, 130. Although not depicted in the drawing, the automated material handling system 140 may comprise a plurality of robots or moveable carriers that are adapted to transport wafers, or a lot of wafers, to various locations within the manufacturing facility 100.

In operation, one or more workpieces (e.g., wafers or wafer lots) 150 may be processed by the manufacturing system 100 to form one or more products in or on the workpieces 150. For example, the automated material handling system 140 may provide workpieces 150 to the various tool groups 105, 110, 115, 120, 125, 130 or the individual tools located therein, when demanded by or scheduled for processing, as discussed above. The workpieces 150 may be processed and/or monitored by one or more of the tools in the tool groups 105, 110, 115, 120, 125, 130 using materials provided by the central utilities system 130 in accordance with an operating recipe. For example, the workpiece 150 may be provided to tools in the groups 105, 110, 115, 120, 125, 130 which may then form one or more gate electrode structures in or on the workpiece 150, in accordance with one or more operating recipes that may be provided to the tool groups 105, 110, 115, 120, 125, 130. Techniques for processing the workpieces 150 in the manufacturing system 100 to form various structure and/or products in or on the workpieces 150 are known to persons of ordinary skill in the art and, in the interest of clarity, only those aspects of processing the workpieces 150 that are relevant to the present invention will be discussed further herein.

The manufacturing system 100 also includes control units that may be used to control one or activities related to processing workpieces 150 in the manufacturing system 100. These activities will be referred to collectively herein as "manufacturing activities," and several illustrative examples of manufacturing activities, and the associated control units, will be discussed below. However, persons of ordinary skill in the art should appreciate that the illustrative manufacturing activities and control units described below are intended to be exemplary and are not intended to limit the present invention. To the contrary, the term "manufacturing activity" will be used herein to refer to virtually any activity that may affect the products formed by processing in the manufacturing system 100, as well as activities that may affect scheduling of the processing, quality or performance of the products, completion dates for workpieces 150, numbers of workpieces 150 processed, and the like. Persons of ordinary skill in the art should also appreciate that the various control units or controllers in the manufacturing system 100 may be implemented in hardware, firmware, software, or any combination thereof. The terms "control unit" and "controller" are considered synonymous and may therefore be used interchangeably herein.

In the illustrated embodiment, the manufacturing system 100 includes an automated materials handling system (AMHS) control unit 155. The AMHS control unit 155 is configured to control the automated material handling system 140 so that workpieces 150 may be provided to the various tool groups 105, 110, 115, 120, 125, 130 or the individual tools located therein, when demanded by or scheduled for processing by one or more of the tools in one or more of the tool groups 105, 110, 115, 120, 125, 130, as discussed above. The AMHS control unit 155 may also be configured to control or regulate the provision of various consumable materials that may be needed by the various processing tool groups 105, 110, 115, 120, 125. For example, such materials may include process gases, process liquids, electrical power, chemical mechanical polishing pads, polishing slurry, spare parts, test or qualification wafers, process kit changes, etc. In one embodiment, the AMHS control unit 155 may also be configured to receive information (such as requests for workpieces and/or consumable materials) from the tool groups 105, 110, 115, 120, 125, 130, as well as individual tools or controllers located therein. The AMHS control unit 155 may use the received information to provide materials to the processing tool groups 105, 110, 115, 120, 125, 130. The workpieces 150 and/or the consumable materials may be provided by the central utilities system 135.

The manufacturing system 100 may include a die/wafer (D/W) control unit 160, which may be configured to provide die/wafer information to any or all of the processing tool groups 105, 110, 115, 120, 125 and/or the central utilities system 130. For example, the die/wafer information may be provided on demand, e.g., in response to a request. The die/wafer information may reflect the processing history of the die/wafers that have previously been processed, e.g., by a tool in one or more of the tool groups 105, 110, 115, 120, 125, 130. Exemplary die/wafer control units 160 include, but are not limited to, run-to-run controllers, fault detection and control units, contamination free manufacturing (CFM) controllers, and the like.

A data systems network (DSN) control unit 165 may be provided to control various data systems that may be employed within the manufacturing facility 100. For example, the DSN control unit 165 may be configured to acquire and/or store data regarding any type of information that may be useful in manufacturing integrated circuit devices. Exemplary data that may be collected and/or distributed by the DSN control unit 165 may include, but is not limited to, data regarding physical characteristics of features formed on or above the wafers in the workpieces 150 as they progress through the manufacturing facility 100, the composition and concentration of the various chemicals in the process gases and/or liquids supplied to the various process modules, as well as any of a variety of different types of metrology data that may be collected by the metrology tools 130. Specific examples of metrology data include, but are not limited to, film thickness, optical properties, critical dimensions, feature profiles, defects, irregularities, etc.

Excursion and/or exception control may be provided by an excursion/exception (E/E) control unit 170, which is configured to monitor tools with the tool groups 105, 110, 115, 120, 125, 130 to detect excursions and/or exceptions during operation of the tools in these groups. Exemplary excursions and exceptions may include failures of one or more tools and shortages of materials such as process gases, process liquids, electrical power, chemical mechanical polishing pads, polishing slurry, spare parts, test or qualification wafers, process kit changes, etc. In one embodiment, the E/E control unit 170 is configured to receive information from the processing, metrology, and/or electrical test tool groups 105, 110, 115, 120, 125, 130, which may be used to detect the excursions and/or exceptions.

A planning and system (PS) control unit 175 may also be provided. In one embodiment, the planning and system control unit 175 may be used to determine one or more priorities associated with various processing tasks. For example, the planning and system control unit 175 may determine processing priorities for the workpieces 150, which may then be provided to the processing tool groups 105, 110, 115, 120 and processed in accordance with the determined priorities. For another example, the planning and system control unit 175 may determine monitoring and/or testing priorities for the workpieces 150, which may then be provided to the metrology and/or electrical test tool groups 125, 130 and the appropriate monitoring and/or testing may be carried out on selected workpieces 150 in accordance with the determined priorities. In one embodiment, the priorities may be global priorities associated with substantially all of the processing performed on the workpieces 150. Alternatively, the priorities may be associated with individual processing steps (or subsets of steps) that may be performed by a single tool or a subset of the tools in the manufacturing system 100.

The control units 155, 160, 165, 170, 175 are communicatively coupled to a central controller 180. Persons of ordinary skill in the art having benefit of the present disclosure should appreciate that the central controller 180 may be implemented in hardware, firmware, software, or any combination thereof. In the illustrated embodiment, the central controller 180 receives information indicating one or more global goals associated with the manufacturing facility 100, as indicated by the arrow 185. As used herein, the term "global goal" refers to goals associated with the number and/or type of products that may be produced by the manufacturing system 100, as well as scheduling of the production of these products. Exemplary global goals may include, but are not limited to, the number of products formed by the manufacturing facility 100, the distribution of product types produced by the manufacturing facility 100, the performance levels of the products, the deadlines for producing these products, and the like. The global goals may be determined by forces such as current market demand for each product, shipping commitments made to clients, lot requests by research and development teams, and the like. For example, fabrication management decision makers, such as managers or vice presidents, may determine one or more priorities indicative of the global goals based upon forces such as current market demand for each product, shipping commitments made to clients, lot requests by research and development teams, and the like.

The central controller 180 may then access information indicative of at least one of the global goals 185. For example, the central controller 180 may receive information indicating production priorities for the manufacturing facility 100 that have been determined based upon one or more of the forces described above. The central controller 180 may use the information indicative of the global goals 185 to determine control information associated with processing one or more of the workpieces 140. For example, if a certain number of a particular product must be delivered to a customer by a predetermined date, the central controller 180 may determine control information that may allow the manufacturing facility 100 to produce the required number of the particular product by the predetermined date. The central controller 180 may then provide portions of the control information to one or more of the control units 155, 160, 165, 170, 175, which may use the control information to control one or more associated manufacturing activities. For example, a central controller 180 may provide control information to the AMHS control unit 155 indicating how many wafers and/or consumable materials must be provided to the processing tool groups 105, 110, 115, 120 in order to produce the required number of the particular product by the predetermined date. The AMHS control unit 155 may then use the provided control information to provide the wafers and/or consumable materials.

FIGS. 2-5 conceptually illustrate exemplary embodiments of semiconductor fabrication facilities. In the illustrated embodiments, the physical layout of the fabrication facilities is depicted. Persons of ordinary skill in the art having benefit of the present disclosure should appreciate that each physical layout may have particular advantages over the other physical layouts shown in FIGS. 2-5 or other physical layouts that are not depicted in any of the figures. For example, particular physical layouts may speed up the process flow associated with producing different types of products on the workpieces processed in a semiconductor manufacturing facility 200. However, only those advantages that are relevant to the present invention will be discussed further herein.

The embodiments shown in FIGS. 2-5 also include controllers associated with the various portions of the semiconductor manufacturing facilities, as discussed above. In the illustrated embodiments, one of these controllers may be selected to act as the central controller for the remaining controllers. Selection of the central controller may be influenced by the physical layout of the fabrication facility, as will be discussed in detail below. However, persons of ordinary skill in the art having benefit of the present disclosure should appreciate that the present invention is not limited to embodiments in which the central controller is selected based on the physical layout of the fabrication facility.

Figure 2:
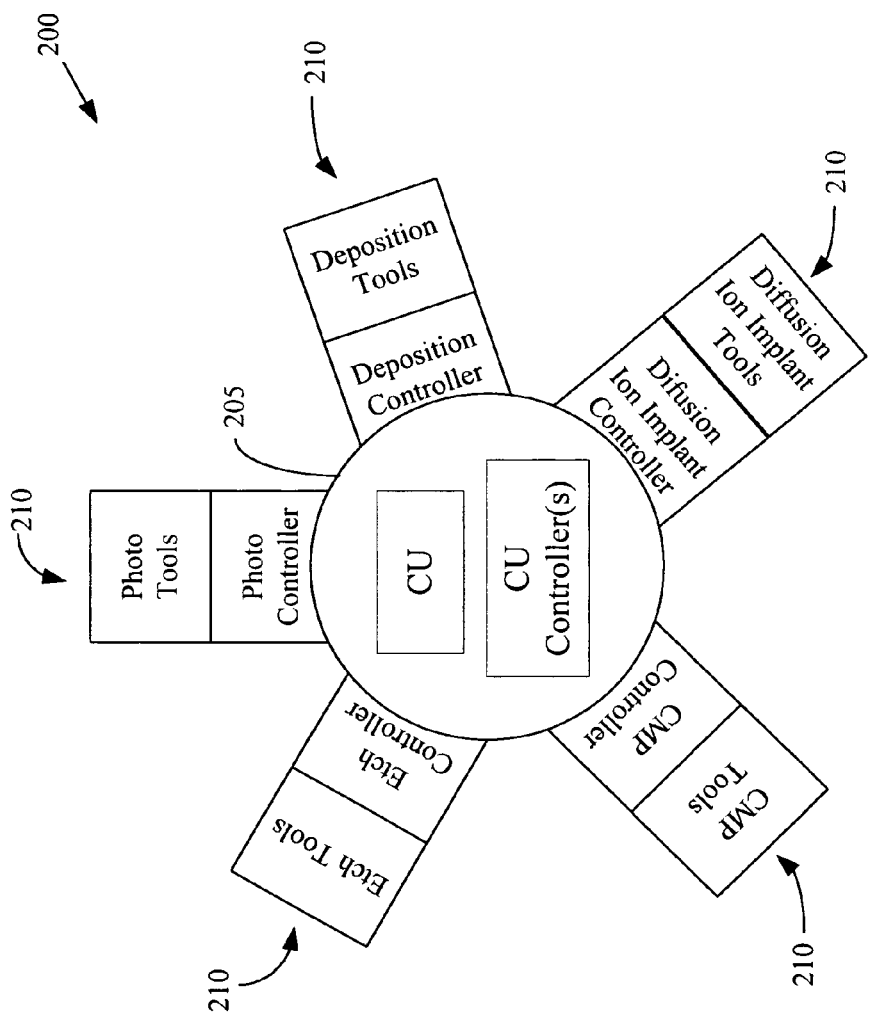
FIGS. 2-5 conceptually illustrate exemplary embodiments of semiconductor fabrication facilities, in accordance with the present invention.

FIG. 2 conceptually illustrates a first exemplary embodiment of a physical layout of a semiconductor manufacturing facility 200. In the illustrated embodiment, the manufacturing facility 200 is arranged in a hub and spoke architecture (e.g., the architecture described in U.S. Pat. No. 5,344,365, incorporated herein by reference in its entirety) in which the central utilities (CU) employed in the manufacturing facility 200 are positioned within a central region 205. The central utilities may include an automated material handling system, a die/wafers system, a data network system, and the like. One or more central utilities controllers may also be implemented in the central region 205. The central utilities controllers may include controllers for the automated material handling system, the die/wafers system, the data network system, an excursion/exception controller, a planning system controller, and the like, as discussed above.

The semiconductor manufacturing facility 200 also includes a plurality of production wings 210 that extend outward from the central region 205. In the illustrated embodiment, each of the production wings 210 includes one or more processing tools, such as one or more etch tools, photolithography tools, deposition tools, diffusion ion implant tools, and chemical mechanical polishing (CMP) tools. The production wings 210 also include controllers associated with each of the groups of tools. Persons of ordinary skill in the art should appreciate that the particular tools shown in FIG. 2 are intended to be illustrative and not to limit the present invention. In alternative embodiments, more or fewer types of tools may be included in more or fewer production wings 210 of the semiconductor manufacturing facility 200.

In one embodiment, one or more of the central utilities controllers may be designated as a central controller for the remaining controllers in the semiconductor manufacturing facility 200. The central utilities controller may therefore determine control information based on one or more global goals, as discussed above, and may then provide a portion of the control information to each of the remaining control units, which may then use the control information to control processing of workpieces. In one embodiment, the central utilities controller may access information from the other controllers and use this information to determine the control information. Since the processing tools in the production wings 210 request and/or receive materials and support from the central utilities, selecting the central utilities controller as the central controller may allow the central controller to determine and/or provide the control information in a more efficient manner.

Figure 3:
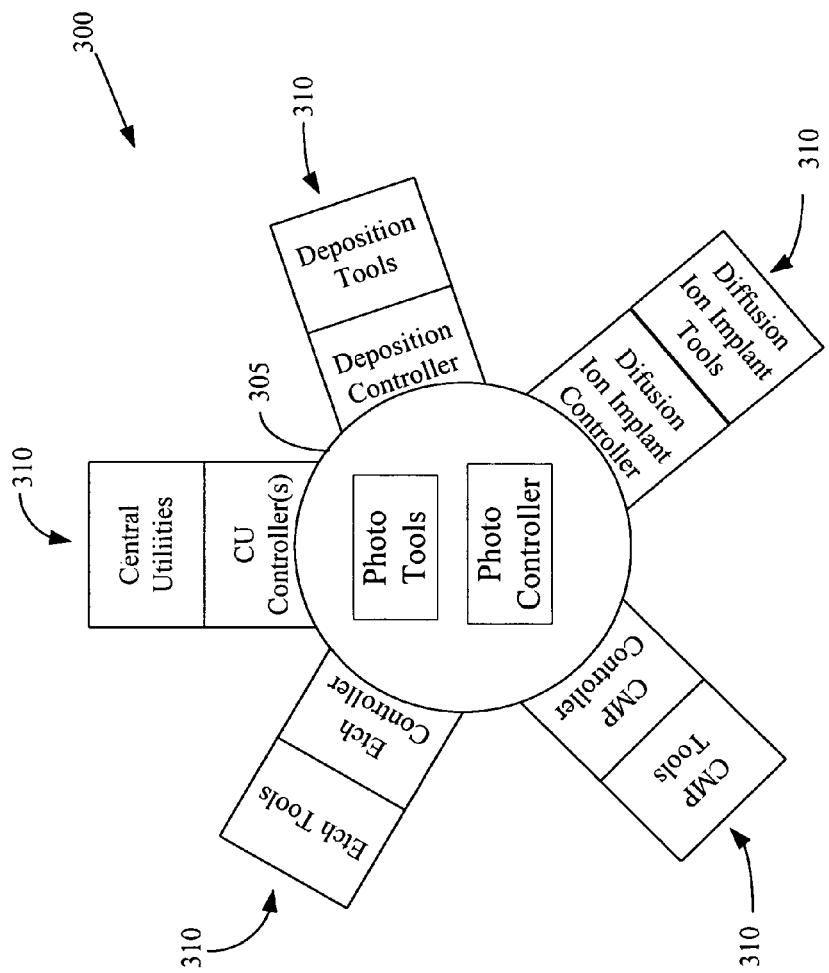

FIG. 3 conceptually illustrates a second exemplary embodiment of a physical layout of a semiconductor manufacturing facility 300. In the second exemplary embodiment, the manufacturing facility 300 is arranged in a hub and spoke architecture in which the photolithography tools employed in the manufacturing facility 300 are positioned within a central region 305. One or more photolithography tool controllers may also be implemented in the central region 305. The manufacturing facility 300 also includes a plurality of production wings 310 that extend outward from the central region 305. In the illustrated embodiment, the production wings 310 include one or more processing tools, such as one or more etch tools, deposition tools, diffusion ion implant tools, and chemical mechanical polishing (CMP) tools, as well as the central utilities and the associated controllers. However, as discussed above, the particular tools shown in FIG. 3 are intended to be illustrative and not to limit the present invention.

In one embodiment, one or more of the photolithography controllers may be designated as a central controller for the remaining controllers in the semiconductor manufacturing facility 300. The photolithography controller may therefore determine control information based on one or more global goals, as discussed above, and may then provide a portion of the control information to each of the remaining control units, which may then use the control information to control processing of workpieces. In one embodiment, the photolithography controller may access information from the other controllers and use this information to determine the control information. The photolithography tools may be a bottleneck in the semiconductor manufacturing facility 300 and therefore selecting the photolithography controller as the central controller may allow the central controller to determine and/or provide the control information in a more efficient manner.

Figure 4:
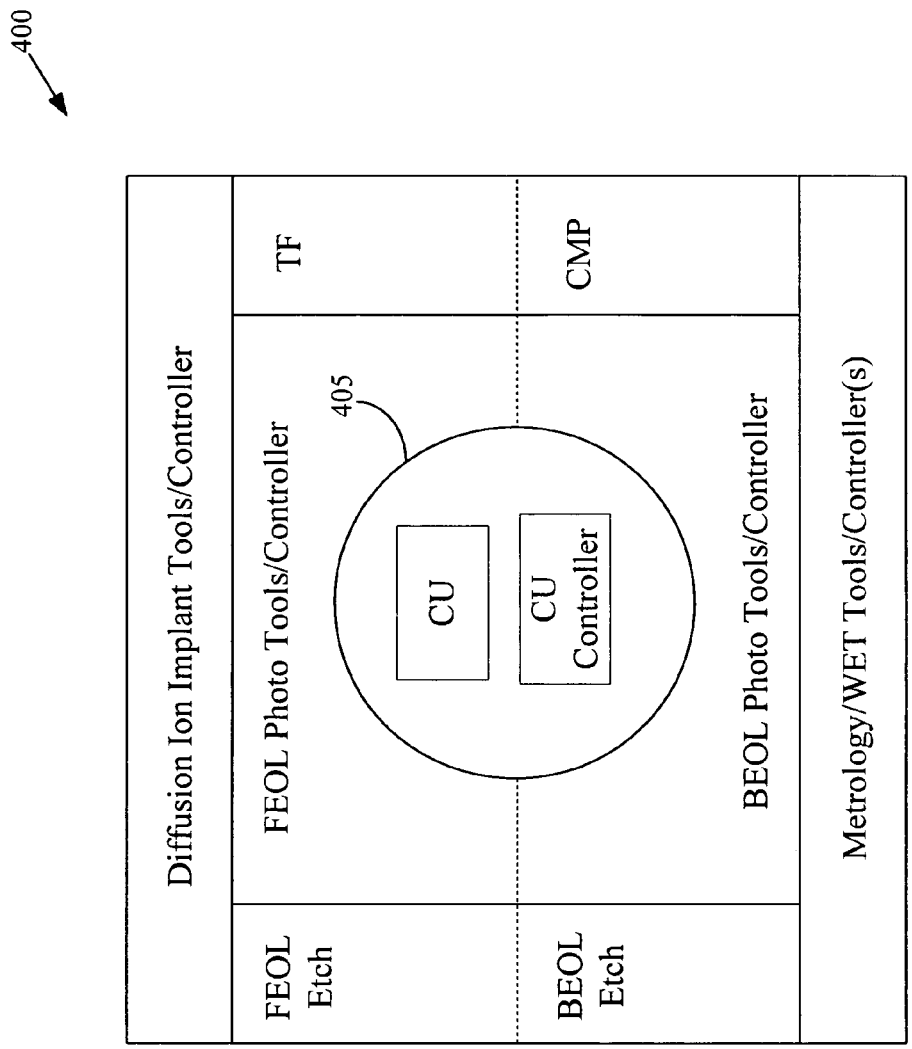
Figure 5:
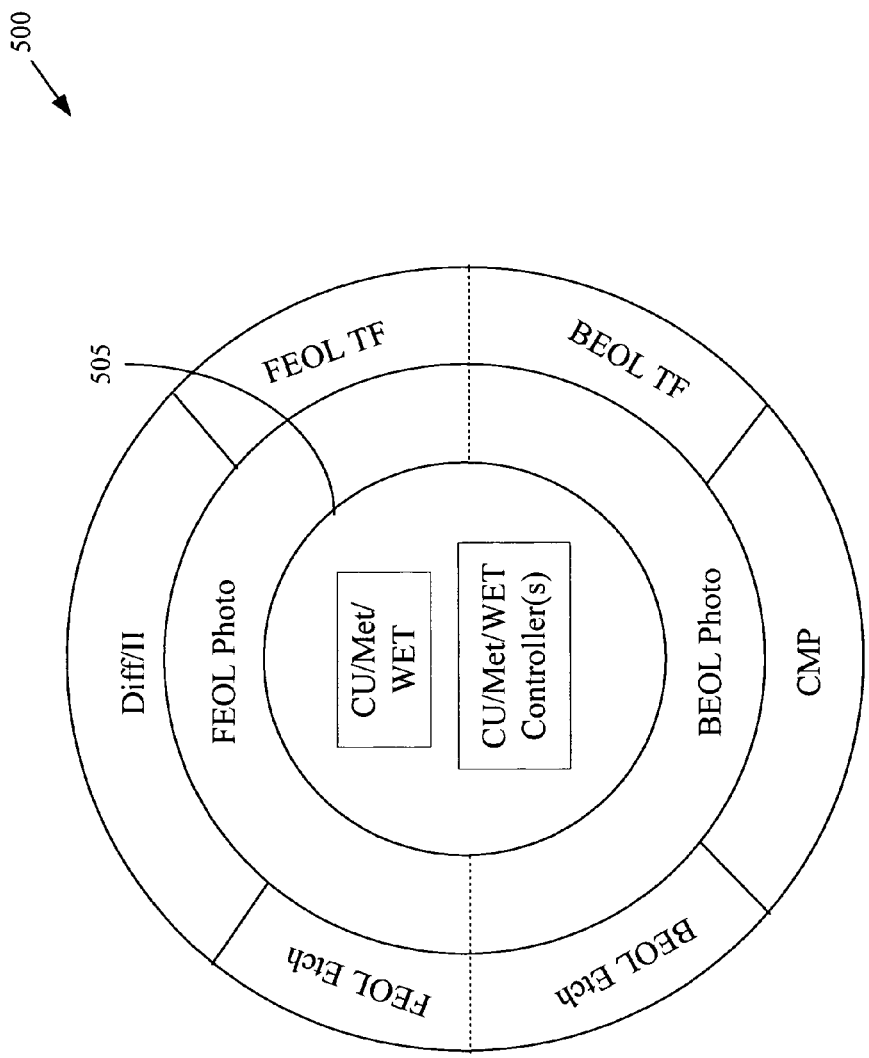

FIGS. 4 and 5 conceptually illustrate third and fourth exemplary embodiments of a physical layout of a semiconductor manufacturing facility 400, 500. In the third and fourth exemplary embodiments, the central utilities and associated controllers employed in the manufacturing facilities 400, 500 are positioned within central regions 405, 505. Tools associated with front-end of the line (FEOL) activities and back-end of line (BEOL) activities may be deployed in different portions of the manufacturing facilities 400, 500. Although not shown in FIGS. 4 and 5, tools associated with middle of the line (MOL) activities may also be deployed in the manufacturing facilities 400, 500. In the third exemplary embodiment, the manufacturing facility 400 is arranged in an approximately rectangular geometry. In the fourth exemplary embodiment, the manufacturing facility 500 is arranged in an approximately circular geometry.

The segregation of the manufacturing activities into these categories may vary somewhat depending upon the particular devices under construction and the particular process flows involved in producing such devices. In one illustrative example, FEOL activities may include all processing activities performed up to the point of forming local interconnects for the integrated circuit device. In the case of forming devices comprised of transistors, the FEOL activities would include complete formation of the basic transistor structures, e.g., gate electrodes, source/drain regions, sidewall spacers, etc. The MOL activities would include formation of local interconnect structures, which are typically comprised of a metal. The local interconnect structures actually contact the transistor devices (or other similar structures). The BEOL activities would include all activities after the formation of the local interconnects. For example, the BEOL activities would include, but are not limited to, the formation of various metallization layers in multiple levels of insulating material, all of which may be performed in accordance with known processing techniques.

In the illustrated embodiment, tools associated with FEOL activities are deployed to one side of the central region 405, 505. For example, diffusion ion implant (Diff/II) tools, FEOL etch, photolithography tools, and FEOL thin film (TF) tools and the associated controllers may be deployed to one side of the central region 405, 505. Tools associated with FEOL activities may then be deployed to the other side of the central region 405, 505. For example, BEOL etch tools, BEOL photolithography tools, chemical mechanical polishing (CMP) tools, metrology and/or wafer electrical test tools, and the associated controllers you may be deployed on the opposite side of the central region 405, 505 from the FEOL tools. In the fourth exemplary embodiment, the metrology and/or wafer electrical test tools and/or controllers may alternatively be deployed in the central region 505.

In one embodiment, one or more of the central utilities controllers may be designated as a central controller for the remaining controllers in the semiconductor manufacturing facility 400, 500. The central utilities controller may therefore determine control information based on one or more global goals, as discussed above, and may then provide a portion of the control information to each of the remaining control units, which may then use the control information to control processing of workpieces. In one embodiment, the central utilities controller may access information from the other controllers and use this information to determine the control information. Since the processing tools associated with FEOL, MOL, and BEOL activities request and/or receive materials and support from the central utilities, selecting the central utilities controller as the central controller may allow the central controller to determine and/or provide the control information in a more efficient manner.

Figure 6:
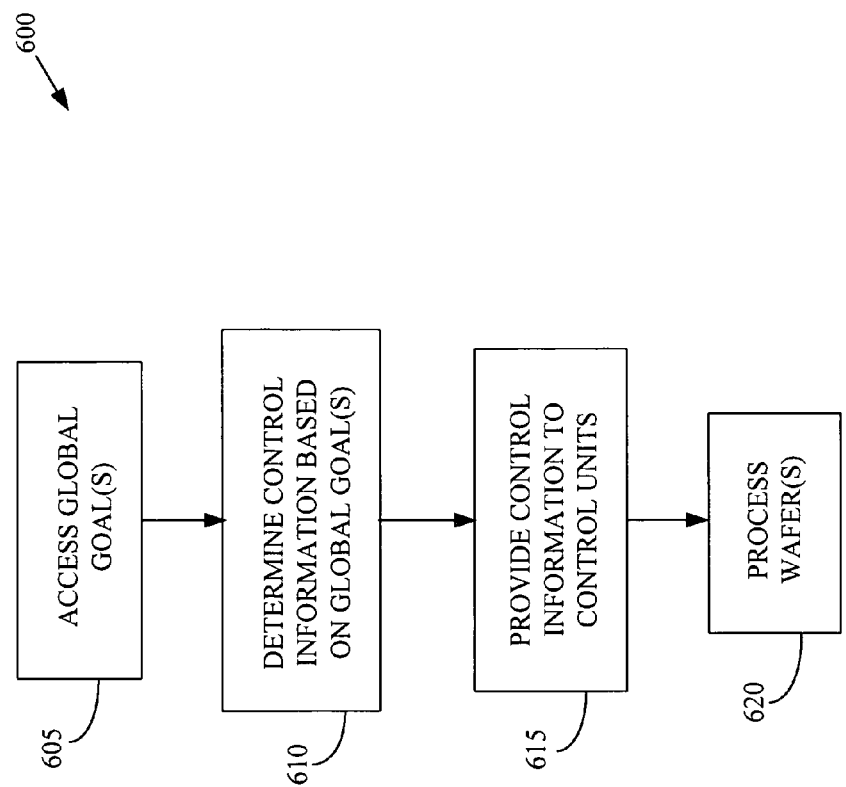
FIG. 6 conceptually illustrates one exemplary embodiment of a method of determining control information based on global goals of a semiconductor manufacturing facility, in accordance with the present invention.

FIG. 6 conceptually illustrates one exemplary embodiment of a method 600 of determining control information based on global goals of a semiconductor manufacturing facility. In the illustrated embodiment, information indicative of one or more global goals may be accessed (at 605), as discussed above. In one embodiment, accessing (at 605) information indicative of one or more global goals may include accessing information indicating that one or more of the global goals have changed, as well as information indicating the new global goals.

A central controller may then determine (at 610) control information based on one or more of the global goals, as well as information that may be collected from other controllers within the semiconductor manufacturing facility. For example, the central controller may collect information indicative of a tool state, a wafer state, a fault condition, an exception, an excursion, and the like from portions of the manufacturing facility. Portions of the control information may be provided (at 615) to one or more other control units, which may then use the control information to process one or more wafers. If the information indicates that one or more of the global goals have changed, the control information may be used to modify one or more operating recipes used to process the one or more wafers.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   accessing information indicative of at least one global goal of a semiconductor manufacturing facility;
   determining control information based on said at least one global goal; and
   providing a portion of the control information to each of a plurality of control units, each of the plurality of control units being configured to control a corresponding manufacturing activity based on the provided portion of the control information.

2. The method of claim 1, wherein accessing the information indicative of said at least one global goal comprises accessing information indicative of at least one of a priority and a constraint associated with at least one product produced by the semiconductor manufacturing facility.

3. The method of claim 2, wherein accessing information indicative of at least one of the priority and the constraint comprises accessing information indicative of at least one of a priority and a constraint determined based on at least one of a market demand for a product produced by the semiconductor manufacturing facility, a shipping commitment for a product produced by the semiconductor fabrication facility, and a lot request.

4. The method of claim 1, wherein providing the portion of the control information to each of the plurality of control units comprises providing at least one portion of the control information to a plurality of control units selected from a group consisting of a material handing controller, a run-to-run controller, a fault detection and control unit, a contamination free manufacture controller, an excursion controller, an exception controller, a data systems network controller, a planning system controller, and a controller associated with at least one type of processing tool.

5. The method of claim 1, further comprising accessing information associated with at least one of the plurality of control units.

6. The method of claim 5, wherein accessing information associated with the plurality of control units comprises accessing information indicative of at least one of a tool state, a wafer state, a fault condition, an exception, and an excursion.

7. The method of claim 5, wherein determining the control information comprises determining the control information based on said at least one global goal and said accessed information associated with the plurality of control units.

8. The method of claim 1, further comprising processing at least one wafer using the provided control information.

9. The method of claim 1, further comprising determining that at least one global goal has changed.

10. The method of claim 9, further comprising determining modified control information based on the changed global goal.

11. The method of claim 10, further comprising providing a portion of the modified control information to each of the plurality of control units.

12. The method of claim 11, further comprising processing at least one wafer using the portions of the modified control information.

13. An apparatus, comprising:
    means for accessing information indicative of at least one global goal of a semiconductor manufacturing facility;
    means for determining control information based on said at least one global goal; and
    means for providing a portion of the control information to each of a plurality of control units, each of the plurality of control units being configured to control a corresponding manufacturing activity based on the provided portion of the control information.

14. An automated semiconductor manufacturing facility, comprising:
    a plurality of control units configured to control a corresponding manufacturing activity based on control information; and
    a central controller configured to:
      access information indicative of at least one global goal of the semiconductor manufacturing facility;
      determine control information based on said at least one global goal; and
      provide the control information to at least one of the plurality of control units.

15. The automated semiconductor manufacturing facility of claim 14, wherein the central controller is configured to access information indicative of at least one of a priority and a constraint associated with at least one product produced by the semiconductor manufacturing facility.

16. The automated semiconductor manufacturing facility of claim 14, wherein the central controller is configured to access information indicative of at least one of a priority and a constraint determined based on at least one of a market demand for a product produced by the semiconductor manufacturing facility, a shipping commitment for a product produced by the semiconductor fabrication facility, and a lot request.

17. The automated semiconductor manufacturing facility of claim 14, wherein the central controller is configured to provide control information to at least one of a material handing controller, a run-to-run controller, a fault detection and control unit, a contamination free manufacture controller, an excursion controller, an exception controller, a data systems network controller, a planning system controller, and a controller associated with at least one type of processing tool.

18. The automated semiconductor manufacturing facility of claim 14, wherein the central controller is configured to access information associated with at least one of the plurality of control units.

19. The automated semiconductor manufacturing facility of claim 18, wherein the central controller is configured to access information indicative of at least one of a tool state, a wafer state, a fault condition, an exception, and an excursion.

20. The automated semiconductor manufacturing facility of claim 18, wherein the central controller is configured to determine the control information based on said at least one global goal and said accessed information associated with the plurality of control units.

21. The automated semiconductor manufacturing facility of claim 14, further comprising a plurality of processing tools associated with the plurality of control units and configured to process at least one wafer based on the control information provided to the associated control unit.

22. The automated semiconductor manufacturing facility of claim 14, wherein the central controller is configured to determine that at least one global goal has changed.

23. The automated semiconductor manufacturing facility of claim 22, wherein the central controller is configured to determine modified control information based on the changed global goal.

24. The automated semiconductor manufacturing facility of claim 23, wherein the central controller is configured to provide modified control information to each of the plurality of control units.

25. The automated semiconductor manufacturing facility of claim 24, wherein the plurality of processing tools are configured to processing at least one wafer based on the modified control information.

* * * * *